3,224,998
RUBBER COMPOSITIONS AND FORMING PROCESS

Robert W. Kirkconnell, Homewood, Ill., assignor to Nalco Chemical Company, Chicago, Ill., a corporation of Delaware
No Drawing. Filed Aug. 23, 1961, Ser. No. 133,319
14 Claims. (Cl. 260—41.5)

This invention relates to novel rubber compositions with improved physical properties, and method of making them. More specifically, the invention is concerned with natural and synthetic raw rubbers having improved physical properties by reason of their content of non-reinforcing fillers and completely substituted polyamine compositions which act as cross-linking agents between the rubbers and fillers and improve their affinity.

In order to improve the physical properties of both natural and synthetic rubber polymers, various compounds, inorganic and organic, are added and intimately blended with the crude rubber to produce a stock with vastly improved physical characteristics. There is a continuous striving in the art to produce final rubber like products which have, for example, increased tensile strength, tear and abrasion resistance, and improved modulus. In addition, many substances are added in order to reduce the overall cost of the final rubber product with substantially no sacrifice of desired physical characteristics. For example, dry pigments, other than those substances acting as vulcanizing agents or vulcanizing aids, are often added to rubber. These pigments both improve the properties of the vulcanizates while also serving as diluents or extenders. The most desirable situation is achieved by addition of a low cost additive which not only acts to dilute the crude rubber and lessen its final cost, but also improves the physical products of the formed rubber product with regard to such characteristics as modulus and ultimate tensile strength.

Dry pigments as additives for rubber are loosely classified either as reinforcing agents or fillers. The former improve the properties of both natural and synthetic vulcanizates, while the latter serve generally as diluents. The most widely used reinforcing agent in the rubber industry today is carbon black. This substance is normally used in all rubber articles which have to meet severe service conditions, and improves the various physical properties of rubber compounds such as tensile strength, tear, and abrasion resistance. A particularly desirable property incorporated into rubber by the use of carbon black is high tensile strength. This is probably due to some type of tight chemical bonding between the carbon black and the base crude rubber, which bonding is effected by various processing steps.

With respect to non-black pigments known as fillers or non-reinforcing agents, only a small amount of reinforcement results from their use. Normally, they act primarily as diluents and have, therefore, certain serious shortcomings when incorporated into raw rubbers, especially with regard to the physical strength of the final modified rubber products. However, while shaped rubber elements containing these non-reinforcing fillers tend to have less tensile strength and elongation than corresponding articles containing carbon black, the use of non-reinforcing fillers permits the making of white or colored objects, which is impossible when using a black pigment. Therefore, these fillers are widely used in spite of consequent loss of certain desirable physical properties.

Therefore, it would be an advantage to the art to increase the reinforcing ability of color-neutral, colored, or colorless non-reinforcing type fillers or diluents, if such a process could be accomplished with ease and little increase in cost of the final rubber-like product. If some class of compounds could be synthesized which act as bonding agents between the fillers and crude rubber or synthetic elastomers whereby excellent tensile strength, high elongation, and excellent tear resistance could be effected, it would be a valuable contribution, especially with regard to rubber products which are either colorless or pigmented with a color other than black.

Therefore, it becomes an object of the invention to devise a method for reinforcing natural and synthetic polymeric crude rubbers employing fillers which are normally considered non-reinforcing.

Another object is to provide a method of incorporating into raw rubber, a completely substituted polyamine composition which acts as a cross-linking agent between the rubber and inert fillers or diluents, or between the filler particles themselves, whereby valuable physical properties are imparted to formed rubber objects.

Still another object is to provide rubber articles with improved tensile strength due to incorporation therein of fillers together with a cross-linking agent composed of a polyamine composition.

Still another object is to provide a method for coating substituted polyamines upon the surface of non-reinforcing rubber fillers which, when later incorporated into the crude rubber, form a product with improved physical strength, due to the cross-linking effect of the polyamine.

Yet another object is to provide substituted polyamine compositions which may be easily incorporated and dispersed in a rubber matrix which contains certain fillers, whereby with subsequent processing steps the same fillers are tightly bound to the rubber matrix or to each other through the action of the polyamines.

An important object of the invention is to provide light colored rubber objects which have higher modulus values, elongation and tensile strength than are normally attained, yet whose other desirable physical properties are not impaired.

A still further object is to provide completely substituted polyamine compositions which may be incorporated into a rubber mix and act as cross-linking agents, but nevertheless, do not scorch the rubber product during the processing and forming steps.

Other objects and advantages of this invention will become apparent from the following detailed description thereof.

In accordance with the invention, it has been discovered that crude natural and synthetic rubbers which, when mixed with non-reinforcing inert fillers, may be considerably improved by adding to the mix at least a cross-linking amount of a completely substituted polyamine composition, said polyamine composition having the following structural formula:

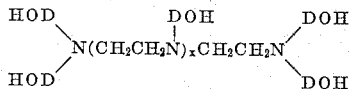

where $x$ is an integer from 0 to 4 and D is a divalent aliphatic hydrocarbon radical containing at least four carbon atoms.

When the raw rubbers, non-reinforcing fillers, and polyamine are mixed and uniformly blended, the mix may be formed into any suitable shape and then vulcanized in any conventional way sufficient to bond the fillers with the raw rubber. The polyamine composition acts as a cross-linking agent between surface groups of the raw rubbers and inert fillers. The final shaped rubber objects containing the polyamine composition and the filler have improved tensile strength and tear resistance and excellent elongation properties.

A modification of the above procedure includes a pretreatment of the non-reinforcing rubber filler with the substituted polyamine. In such a treatment, the filler particles are surface-coated with the polyamine, which has sufficient reactivity in a separate subsequent process step to cross-link raw, natural, and/or synthetic rubbers with the normally inert filler. The coated fillers may be prepared in many different ways. For example, the inert pigments may be blended directly with the completely substituted polyamine and then processed through some type of milling operation such as a ball or hammer mill. A paste or slurry of the filler may be made and the polyamine added thereto. Any other type of coating system may be used, the only proviso being that the amine be intimately blended with the filler whereby a uniform surface coating of the inert filler particles is effected. The coated filler may then be later used by a ready incorporation into the rubber matrix.

The cross-linking polyamine compositions may be readily synthesized in a variety of known methods. For example, they may be prepared by adding to the requisite polyalkylene polyamine, butylene oxide adducts or higher alkylene oxide adducts in an amount sufficient to completely replace all the hydrogens of the reactive or free nitrogen atoms so that a completely substituted polyamine composition is made. Such polyamines as ethylene diamine, diethylene triamine, triethylene tetramine, tetraethylene pentamine, etc., may be employed. The method of adding the oxide adducts is well-known and need not be set forth in detail. Preferred compositions corresponding to the structural formula given above are those where $x$ is from 0 to 3 and D is a divalent aliphatic hydrocarbon radical containing four carbon atoms. It is to be understood that the hydroxyl group need not necessarily be a terminal group. That is, it need not occur at the end of a linear chain. In other words, the radical D may be branched or linear in any chemical configuration and the hydroxide group may be substituted on any of radical D's carbon atoms. As will be shown later, it is necessary that the nitrogen atoms be completely substituted with the alkoxylating agent in order to provide suitable rubber compositions.

Typical non-reinforcing inert fillers which may be employed in the practice of the invention include such materials as calcium carbonate, titania, clay, silica, zinc oxide and talc.

If the polyamine is to be added to a mix containing both the crude rubber and inert filler, it may be added in amounts of from 0.1 to 20 parts by weight, based on the weight of 100 parts of rubber matrix. Preferably, however, the substituted polyamine is added in amounts of from 0.1 to 10 parts by weight, based on the weight of 100 parts of raw rubber. Under conditions whereby the filler is pretreated with the substituted polyamine, it may be added to the filler in amounts ranging from 0.1 to 25 parts by weight, based on the weight of 100 parts of inert filler. More preferably, however, the amine is added in a range from 0.1 to 10 weight parts based on the weight of 100 parts of filler.

The types of raw rubbers employed in the inventive system of his case, may be chosen from widely varying compositions. These include such compounds as butadiene-styrene copolymers, polybutadienes, butadiene-acrylonitrile copolymers, polychloroprenes and copolymers, polyisoprene, isobutylene-isoprene polymers, modified polyethylene, polyacrylates and copolymers, polyesters, modified polyesters, silicones, and natural rubber. The above synthetic rubbers are available under such trade names as SBR, Polysar, GR-I, Buna S. Buna BN, Butaprene, Chemigum, Hycar, Paracril, Silastic, Vulcaprene, Hypalon S-2, etc. In particular, crude rubbers such as butadiene-styrene copolymers, and polyisobutylene elastomers and natural rubbers are well suited for use in the invention. The strength of the above crude rubber elastomers is greatly increased through the use of the above described filler and cross-linking polyamine agent combination, particularly with those elastomers that have a tendency to crystallize under tension.

It has been determined that the base polyethylene polyamine employed must be fully substituted with alkoxylating groups. The primary reason for this requirement is the avoidance of the problem of "scorch." Scorching has a particularly undesirable effect upon rubber stock whereby incipient vulcanization occurs during any of the processing steps preceding the final vulcanization or during storage between processing steps. A properly compounded and blended material which has little tendency to scorch may be extruded from a die or sheeted from a calender without lumps. However, if a material is susceptible to scorching, it becomes lumpy and wavy and then must be scrapped or worked away.

Scorch time is the amount of time to which a vulcanizable mixture may be exposed to a specified temperature before scorching occurs. Those rubber materials having a long scorch time are said to have good "delayed action." In order to measure the degree of delayed action, the viscosity of a rubber stock mixture is determined through the use of a Mooney plastometer. Using this measuring device, a sudden change in viscosity with time of heating is noted at any particular desired test temperature. This break is measured in terms of the time required for it to occur.

While the compositions of the invention are devised specifically to increase the cross-linking between the non-reinforcing filler and the raw rubber, another aim is to achieve this role without sacrificing any other physical properties of the final rubber product or cause any other processing problems such as scorch from the incorporation of the polyamine composition. Therefore, it was surprising to learn that a fully substituted polyethylene polyamine was clearly superior to a partially substituted composition especially with regard to length of scorch time. In other words, the fully substituted polyamine composition, even when added at relatively high dosages, causes little incipient vulcanization, nor does it accelerate the curing beyond practical limits. This particularly desirable property allows the rubber stock to be closely controlled with regard to curing by addition of known accelerators and alleviates the problem of adjusting the dosage of these accelerators to compensate for the acceleration caused by addition of the polyamine cross-linking agents. In some carefully controlled situations the polyamines of the invention may perform the dual role of acceleration and cross-linking without resort to known accelerators. The final rubber products of the invention can then be properly compounded and processed without any undesirable prevulcanization problems.

The added feature of the invention whereby a desirable Mooney scorch time is obtained is not only dependent upon the fact that a fully substituted polyamine molecule is used, but also is dependent upon the particular alkoxylating group which has ben added to the polyamine base molecule. The above facts will be pointed out with more clarity in further discussion of the invention below.

EVALUATION OF THE INVENTION

In order to determine the efficacy of the invention, a representative synthetic rubber, namely, a butadiene-styrene copolymer was used as the rubber matrix. To this was added a well-known talc inert filler and various other rubber additives as shown in Table I below.

TABLE I

| Material: | Parts |
|---|---|
| Styrene-butadiene elastomer | 100.0 |
| Talc | 75.0 |
| Zinc oxide | 5.0 |
| Stearic acid | 1.0 |
| Aminox antioxidant | 1.0 |
| Sulfur | 3.0 |
| Thiazole accelerator | 0.5 |

To the above rubber stock was added varying amounts of a butylene oxide adduct of ethylene diamine designated as Composition A. The nitrogen atoms were completely substituted with four moles of butylene oxide and had the probable molecular structure as follows:

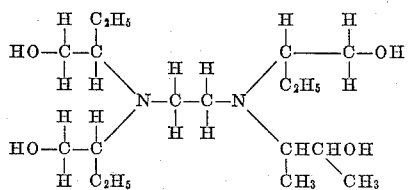

Amounts of this substituted polyamine composition varying from 0.5 to 4.0 parts were added to aliquots of the basic rubber stock formulation of Table I. After the polyamine composition had been added, the rubber stock was cured at 280° F. for various times, as shown in the following tables.

The physical properties of the final cured rubber compositions containing the substituted polyamines were completely studied by various test methods which will be briefly discussed below. These test methods need not be set out with any painstaking particularity, since they are well-known physical property tests used throughout the rubber art.

Tensile tests, including a determination of the tensile strength, modulus, and breaking or ultimate elongation of vulcanized rubber are extensively used in the rubber industry and were run on the rubber stock samples containing the above varying amounts of polyamine composition. The rubber samples after various cure times were held between two jaws, one of which was rigidly connected with a tensile tester with a weighing lever. The other jaw was moved away from the one connected to a weighing lever, at constant speed by a motor and an endless screw. The tensile strength and elongation were then recorded simultaneously as a curve of Cartesian coordinates. The results in the following tables are expressed in pounds per square inch as referred to the intial cross section of the sample. The tensile force for a given elongation is the modulus. In other words different forces must be exerted on the samples to give them the same elongation and the value of this force is known as the modulus. For example at 300 or 500% elongation, the modulus or stress necessary to produce the given elongation, is the stress required to stretch the specimen 300 or 500%. The elongation at the moment of break is known as the maximum or ultimate elongation.

A hardness test or the resistance offered to the penetration of a solid body, such as a blunt point, was also run. A Shore durometer was used. This piece of equipment has a dial indicator responsive to the degree of penetration of a spring loaded pointer into a rubber sample. The more or less amplified penetration was recorded after test of samples having various times of cure.

The tear resistance, a force expressed in pounds per inch thickness of sample, was measured by a gradual tear test effected by subjecting the rubber after various times of cure to extensive deformation. A cut is made in the sample before carrying out the test. The sample is then placed in the jaws of a tensile tester which stretches the sample and indicates the force necessary to initiate and maintain a continuation of tear at the point of the cut.

The permanent set is a measure of the elasticity of rubber whereby the rubber sample is maintained in the extended state for a given time. When the stress is ceased, the sample resumes very slowly its original dimensions. The residual deformation after the release of the stress is generally known as the permanent set of rubber. This property is measured on a frame equipped with stationary and movable jaws, the latter set to the desired elongation by means of a belt around a drum and a set screw. The distance between the two reference marks made on the sample before and after stretching for a given time interval are a measure of the value of the permanent set. This property was also measured for the various cured rubber samples after amine addition.

A compression test was also determined whereby one sample of each run was withdrawn and subjected to a load for 24 hours at 158% F. The compression behavior was then noted.

A Bashore rebund test was also employed. This is a dynamic test whereby a weighted pendulum hits the rubber samples and the amplitude of the rebound of the pendulum was measured. The resiliency or rebound is then the ratio of the energy given to the pendulum by the sample, to the energy given to the sample by the swing of the pendulum. This particular dynamic test was also run on only one sample of each run containing the various amounts of polyamine composition.

The Mooney viscosity was determined using a Mooney viscometer which measures the resistance offered by the rubber sample to a continuous shearing stress at constant speed. Here the rubber sample tested was placed around the rotating disc in a chamber of the Mooney viscometer, heated at 212° F. The resistance of the rubber slows down the rotation of the disc and is balanced by a calibrated spring whose compression is measured by a micrometer which indicates the viscosity.

The Mooney scorch time and cure rate were also measured by use of a Mooney viscometer equipped with a special rotator. A sample of the compound to be tested was placed in the viscometer and held at 250° F. After a starting period, an equilibrium is attained and a value of plasticity, as indicated by the viscometer, remains constant for a certain period of time. At first signs of vulcanization, this value will increase gradually. When the viscosity reaches ten Mooney units higher than the plateau, a scorce time is recorded.

*Example I*

Tables II–VII below set forth the values for the particular physical properties tested and recorded.

TABLE II

| 0.5 Parts Composition A | Minutes | | | |
| --- | --- | --- | --- | --- |
| | 90 | 120 | 180 | 240 |
| Tensile strength | 2,180 | 2,650 | 2,660 | 2,340 |
| Ultimate elongation | 860 | 830 | 755 | 710 |
| Modulus at— | | | | |
| 100% | 314 | 344 | 408 | 419 |
| 200% | 503 | 551 | 628 | 639 |
| 300% | 628 | 675 | 765 | 765 |
| 400% | 732 | 811 | 932 | 942 |
| 500% | 870 | 1,010 | 1,180 | 1,205 |
| 600% | 1,090 | 1,320 | 1,610 | 1,620 |
| Shore "A" Hardness | 57 | 59 | 63 | 62 |
| Tear resistance | 270 | 243 | 276 | 267 |
| Permanent set in tension | 75.0 | 73.8 | 68.8 | 65.0 |
| Percent $E_B$ (tear) | 480 | 340 | 340 | 330 |
| Compression set—Method B | | 20.5 | | |
| Bashore rebound | | 39.0 | | |

Mooney viscosity ML–212° F.: 4 minutes, 42.0; minimum, 38.0.
Mooney scorch MS–250° F.: scorch time, 150′; cure rate 30′.

TABLE III

| 1.0 Parts Composition A | Minutes | | | |
|---|---|---|---|---|
| | 60 | 90 | 120 | 180 |
| Tensile strength | 3,070 | 3,400 | 3,580 | 3,000 |
| Ultimate elongation | 845 | 790 | 785 | 720 |
| Modulus at— | | | | |
| 100% | 356 | 419 | 419 | 419 |
| 200% | 575 | 660 | 670 | 639 |
| 300% | 744 | 838 | 848 | 807 |
| 400% | 922 | 1,070 | 1,080 | 1,035 |
| 500% | 1,190 | 1,410 | 1,445 | 1,390 |
| 600% | 1,590 | 1,940 | 2,010 | 1,990 |
| Shore "A" Hardness | 61 | 62 | 64 | 64 |
| Tear resistance | 292 | 313 | 302 | 292 |
| Permanent set in tension | 77.5 | 75.0 | 72.5 | 69.3 |
| Percent $E_B$ (tear) | 420 | 400 | 380 | 320 |
| Compression set—Method B | | | 14.4 | |
| Bashore rebound | | | 39.0 | |

Mooney viscosity ML–212° F.: 4 minutes, 40.0; minimum, 37.5.
Mooney scorch MS–250° F.: scorch time, 97'30"; cure rate, 13'15".

TABLE IV

| 1.5 Parts Composition A | Minutes | | | | |
|---|---|---|---|---|---|
| | 30 | 45 | 60 | 90 | 120 |
| Tensile strength | 3,140 | 3,560 | 3,600 | 3,230 | 3,420 |
| Ultimate elongation | 930 | 830 | 760 | 690 | 715 |
| Modulus at— | | | | | |
| 100% | 354 | 416 | 450 | 498 | 499 |
| 200% | 582 | 696 | 722 | 769 | 769 |
| 300% | 739 | 864 | 921 | 978 | 966 |
| 400% | 884 | 1,070 | 1,170 | 1,250 | 1,250 |
| 500% | 1,080 | 1,400 | 1,570 | 1,705 | 1,715 |
| 600% | 1,405 | 1,870 | 2,200 | 2,390 | 2,390 |
| Shore "A" Hardness | 60 | 64 | 65 | 65 | 65 |
| Tear resistance | 298 | 333 | 348 | 316 | 303 |
| Permanent set in tension | 83.8 | 82.5 | 81.3 | 73.8 | 72.5 |
| Percent $E_B$ (tear) | 470 | 430 | 400 | 320 | 320 |
| Compression set—Method B | | | 19.0 | | |
| Bashore rebound | | | 41.0 | | |

Mooney viscosity ML–212° F.: 4 minutes, 38.0; minimum, 36.5.
Mooney scorch MS–250° F.: scorch time, 57'; cure rate, 6'15".

TABLE V

| 2.0 Parts Composition A | Minutes | | | | | |
|---|---|---|---|---|---|---|
| | 20 | 30 | 45 | 60 | 90 | 180 |
| Tensile strength | 3,480 | 3,620 | 3,280 | 3,330 | 3,280 | 3,170 |
| Ultimate elongation | 900 | 805 | 725 | 710 | 670 | 650 |
| Modulus at— | | | | | | |
| 100% | 403 | 465 | 465 | 475 | 517 | 547 |
| 200% | 650 | 744 | 755 | 764 | 795 | 845 |
| 300% | 805 | 909 | 950 | 960 | 1,025 | 1,075 |
| 400% | 971 | 1,145 | 1,200 | 1,240 | 1,320 | 1,390 |
| 500% | 1,230 | 1,530 | 1,630 | 1,690 | 1,820 | 1,960 |
| 600% | 1,600 | 2,065 | 2,270 | 2,360 | 2,580 | 2,790 |
| Shore "A" Hardness | 61 | 64 | 65 | 66 | 66 | 66 |
| Tear resistance | 267 | 344 | 326 | 301 | 329 | 310 |
| Permanent set in tension | 90.0 | 85.0 | 77.5 | 75.0 | 72.8 | 72.5 |
| Percent $E_B$ (tear) | 340 | 410 | 340 | 320 | 320 | 310 |
| Compression set—Method B | | | | 20.5 | | |
| Basehore rebound | | | | 42.5 | | |

Mooney viscosity ML–212° F.: 4 minutes, 39.0; minimum, 38.0.
Mooney scorch MS–250° F.: scorch time, 33'15"; cure rate, 4'30".

TABLE VI

| 3.0 Parts Composition A | Minutes | | | | | | |
|---|---|---|---|---|---|---|---|
| | 10 | 15 | 20 | 30 | 60 | 90 | 120 |
| Tensile strength | 3,200 | 3,800 | 3,420 | 3,100 | 3,300 | 2,950 | 3,230 |
| Ultimate elongation | 960 | 860 | 790 | 690 | 610 | 565 | 600 |
| Modulus at— | | | | | | | |
| 100% | 326 | 408 | 490 | 510 | 613 | 645 | 626 |
| 200% | 540 | 652 | 735 | 795 | 945 | 985 | 915 |
| 300% | 673 | 815 | 917 | 1,010 | 1,210 | 1,260 | 1,170 |
| 400% | 815 | 1,020 | 1,170 | 1,295 | 1,610 | 1,670 | 1,570 |
| 500% | 1,010 | 1,325 | 1,560 | 1,785 | 2,280 | 2,360 | 2,280 |
| 600% | 1,285 | 1,790 | 2,090 | 2,460 | 3,240 | | 3,230 |
| Shore "A" Hardness | 60 | 63 | 65 | 66 | 68 | 69 | 69 |
| Tear resistance | 302 | 304 | 302 | 300 | 334 | 354 | 352 |
| Permanent set in tension | 90.0 | 91.2 | 83.9 | 78.8 | 75.0 | 72.3 | 72.3 |
| Percent $E_B$ (tear) | 520 | 400 | 340 | 320 | 270 | 280 | 300 |
| Compression set— | | | | | | | |
| Method B | | | | 29.6 | | | |
| Bashore rebound | | | | 45.0 | | | |

Mooney viscosity ML–212° F.: 4 minutes, 41.0; minimum, 39.0.
Mooney scorch MS–250° F.: scorch time, 13'; cure rate 2'.

TABLE VII

| 4.0 Parts Composition A | Minutes | | | | | | |
|---|---|---|---|---|---|---|---|
| | 10 | 15 | 20 | 30 | 60 | 90 | 120 |
| Tensile strength | 3,230 | 3,470 | 3,340 | 3,260 | 2,990 | 2,740 | 3,260 |
| Ultimate elongation | 890 | 820 | 735 | 700 | 590 | 570 | 600 |
| Modulus at— | | | | | | | |
| 100% | 334 | 395 | 455 | 479 | 554 | 558 | 624 |
| 200% | 557 | 658 | 728 | 765 | 875 | 842 | 925 |
| 300% | 709 | 830 | 910 | 978 | 1,150 | 1,095 | 1,205 |
| 400% | 810 | 1,030 | 1,170 | 1,295 | 1,560 | 1,500 | 1,660 |
| 500% | 1,090 | 1,365 | 1,590 | 1,805 | 2,220 | 2,130 | 2,360 |
| 600% | 1,450 | 1,860 | 2,205 | 2,550 | | | 3,260 |
| Shore "A" Hardness | 61 | 63 | 64 | 66 | 67 | 67 | 68 |
| Tear resistance | 310 | 310 | 327 | 334 | 327 | 312 | 350 |
| Permanent set in tension | 86.3 | 86.3 | 81.3 | 78.8 | 70.0 | 66.3 | 65.0 |
| Percent $E_B$ (tear) | 500 | 410 | 360 | 360 | 290 | 270 | 280 |
| Compression set— | | | | | | | |
| Method B | | | | 35.1 | | | |
| Bashore rebound | | | | 44.0 | | | |

Mooney viscosity ML–212° F.: 4 minutes, 38.0; minimum, 36.0.
Mooney scorch MS–250° F.: scorch time, 10'45"; cure rate, 2'.

The above data illustrates that the substituted polyamine compositions help to impart high tensile strengths to the base rubber containing a filler additive. These strengths are maintained over a broad range of addition of polyamine. Also, extremely high modulus values and high tear strengths showing a marked increase in crosslinking of the raw rubber with the filler were noted with increased additions of the polyamine composition.

A very valuable physical property of decreased cure time was dramatically shown by increased addition of the polyamine. However, in spite of this, the rubber stock compositions remained safe throughout the processing. Particularly desirable scorch times and cure rates were reached by using 1–3 parts of polyamine per 100 parts of elastomer. In general, a scorch time of 20 minutes at the 250° F. temperature is considered a safe time for extrusion of tire treads and 10 minutes at the same temperature is normally a safe period of time for a compound used for rapid moulding of small articles. Consequently, even at addition of 4.0 parts of the polyamine composition the scorch time is a safe period of time for small article mouldings.

The sample of styrene-butadiene copolymer with the same additives as listed in Table I was also cured and tested at various times without addition of any substituted polyamine. This sample shows on the average, the tensile strength of about 1700 lbs. per square inch and a tear resistance of about 240 lbs. per inch. In addition, the modulus values were 40 to 80% less on the average. For example, a cured rubber sample containing 2.0 parts of polyamine composition showed that on the average the modulus values for the treated sample were about 60% more than for a sample of rubber stock cured without any polyamine cross-linking agent.

The same types of determinations were also made on samples containing natural rubber and calcium carbonate filler. While the problem of tensile strength is not as great as in synthetic rubbers, the polyamine composition considerably increased this property along with the tear resistance and modulus values. Again the scorch time was not considerably lowered below a critical value, and the cure rate was markedly increased but within safe limits.

*Example II*

A seven mole adduct of butylene oxide and tetraethylene pentamine was synthesized and tested at various additive concentrations with polyisobutylene rubber containing a kaolin clay. Again, up to 50% increases in tensile strength were noted with corresponding increase in cure rate. The scorch time remained at a sufficiently high level, so that good processing properties of the polyisobutylene rubber were insured, without incipient vulcanization.

Example III

One hundred parts of talc were pretreated with two parts of a four mole butylene oxide adduct of ethylene diamine. The two compositions were intimately mixed and the resulting mixture ball-milled to assure uniform blending and even coating of the amine upon the talc. The filler-polyamine composition was then incorporated into a styrene-butadiene copolymer and the same type of physical determinations were made as in Example I. Essentially, the same results were obtained with the formed rubber object having high tensile strength, increased modulus values, high elongation, and increased tear resistance. This example points out the versatility of the invention since a large bath of filler may be first pretreated and then added in increments, as needed, to the base rubber stock.

In addition to the foregoing improved and unusual achievements of increasing the strength of various natural and synthetic rubbers, and increasing cure rate without accompanying rapid decrease in scorch time, the rubber compositions showed increased hardness and quick recovery in dynamic compression tests. Also improvement in dynamic flexing, abrasion, aging, and resistance to ozone and various chemical reagents such as acids and bases was noted in some cases. At the very least, these desirable properties were not injured by incorporation of the polyamine compositions.

While certain representative embodiments and details have been shown for the purpose of illustrating the invention, it will be apparent to those skilled in the art that various changes and modifications may be made therein without departing from the spirit or scope of the invention.

I claim:

1. The method of reinforcing nautral and synthetic polymeric rubbers which comprises the steps of forming a mix of rubber selected from a group consisting of natural and synthetic rubber, non-reinforcing fillers and at least a cross-linking amount of a completely substituted polyamine composition, said polyamine composition having the following structural formula:

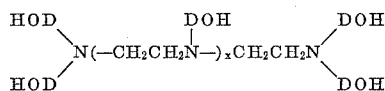

where $x$ is an integer from 0 to 5 and D is a divalent aliphatic hydrocarbon radical containing at least 4 carbon atoms, uniformly blending all the constituents of the mix, forming said mix into a suitable shape and vulcanizing said mix sufficiently to bond said fillers with said rubbers.

2. The method of claim 1 where the rubber is selected from the group consisting of natural rubber, butadiene-styrene copolymers, polybutadienes, butadiene-acrylonitrile copolymers, polychloroprenes, and copolymers thereof, polyesters, and polyacrylates and copolymers thereof, and the mix contains at least 0.1 part of polyamine based on 100 parts of said rubber.

3. The method of claim 1 where the rubber is selected from the group consisting of natural rubber, butadiene-styrene copolymers, polybutadienes, butadiene-acrylonitrile copolymers, polychloroprenes and copolymers thereof, polyesters, and polyacrylates and copolymers thereof, the non-reinforcing filler is selected from the group consisting of calcium carbonate, titania, clay, silica, zinc oxide, and talc, and said filler and the substituted polyamine composition are both added in at least 0.1 part based on 100 parts of said rubber.

4. The method of claim 1 where the rubber is a butadiene-styrene copolymer, the non-reinforcing filler is selected from the group consisting of, calcium carbonate, titania, clay, silica, zinc oxide, and talc, and 0.1–10 parts of polyamine are added to the mix based on 100 parts of said rubber.

5. The method of claim 1 where the rubber is a butadiene-styrene copolymer, the non-reinforcing filler is talc, the polyamine composition is added in amounts from 0.1–5 parts by weight based on 100 parts of said rubber, $x$ is 0, and D is a radical containing 4 carbon atoms.

6. A rubber-like shaped article of improved tensile strength which comprises a cured rubber base selected from the group consisting of natural and synthetic rubber cross-linked with a non-reinforcing filler and at least a cross-linking amount of a polyamine composition with the following structural formula:

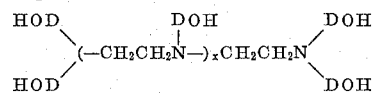

where $x$ is an integer from 0 to 5 and D is a divalent aliphatic hydrocarbon radical containing at least 4 carbon atoms.

7. The article of claim 6 where the rubber is selected from the group consisting of natural rubber, butadiene-styrene copolymers, polybutadienes, butadiene-acrylonitrile copolymers, polychloroprenes and copolymers thereof, polyesters, and polyacrylates and copolymers thereof, and the article contains at least 0.1 weight part of polyamine based on 100 parts of said rubber.

8. The article of claim 6 where the rubber is selected from the group consisting of natural rubber, butadiene-styrene copolymers, polybutadienes, butadiene-acrylonitrile copolymers, polychloroprenes and copolymers thereof, polyesters, and polyacrylates and copolymers thereof, the non-reinforcing filler is selected from the group consisting of calcium carbonate, titania, clay, silica, zinc oxide, and talc, and said filler and the substituted polyamine composition are both present in amounts of at least 0.1 part by weight based on 100 weight parts of said rubber.

9. The article of claim 6 where the rubber is a butadiene-styrene copolymer, the non-reinforcing filler is selected from the group consisting of calcium carbonate, titania, clay, silica, zinc oxide, and talc, and 0.1–10 parts by weight of polyamine are present based on 100 weight parts of said rubber.

10. The article of claim 6 where the rubber is butadiene-styrene copolymers, the non-reinforcing filler is talc, the polyamine composition is present in from 0.1–5 parts by weight based on 100 parts of said rubber, $x$ is 0, and D is a radical containing 4 carbon atoms.

11. A rubber-reinforcing composition which comprises a non-reinforcing rubber filler which has its component particles surface coated with at least an amount of a completely substituted polyamine sufficient to cross-link said filler with natural and synthetic rubbers, said polyamine composition having the following structural formula:

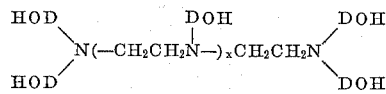

where $x$ is an integer from 0 to 5 and D is a divalent aliphatic hydrocarbon radical containing at least 4 carbon atoms.

12. The composition of claim 11 where the non-reinforcing rubber filler is surface coated with at least 0.1 weight part of said substituted polyamine.

13. The composition of claim 11 where the non-reinforcing rubber filler is selected from the group consisting of calcium carbonate, titania, clay, silica, zinc oxide and talc, said filler having surface coated with 0.1–10 weight parts of polyamine based on 100 weight parts of filler.

14. The composition of claim 11 where the non-reinforcing rubber filler is talc which has its surface coated with 0.1–10 parts by weight of polyamine based on 100 weight parts of talc, $x$ is 0 and D is a radical containing 4 carbon atoms.

(References on following page)

References Cited by the Examiner

UNITED STATES PATENTS 2,697,118 12/1954 Lundsted et al. _____ 260—584
2,709,160 5/1955 Korejwa et al. _____ 260—41.5
2,891,027 6/1959 Coler at al. _____ 260—30.6

OTHER REFERENCES

Compounding Ingredients for Rubber, Bill Bros. Pub. Co., 3d ed., page 338.

MORRIS LIEBMAN, *Primary Examiner.*

LEON J. BERCOVITZ, *Examiner.*